(No Model.)

P. SINSZ.
GLAZIER'S DIAMOND.

No. 520,247. Patented May 22, 1894.

WITNESSES:—
L. I. Van Horn.
Chas. B. Mann Jr.

INVENTOR:—
Philip Sinsz
By Chas. B. Mann
ATTORNEY.

UNITED STATES PATENT OFFICE.

PHILIP SINSZ, OF BALTIMORE, MARYLAND.

GLAZIER'S DIAMOND.

SPECIFICATION forming part of Letters Patent No. 520,247, dated May 22, 1894.

Application filed December 27, 1893. Serial No. 494,872. (No model.)

*To all whom it may concern:*

Be it known that I, PHILIP SINSZ, a citizen of the United States, residing at Baltimore, in the State of Maryland, have invented certain new and useful Improvements in Glaziers' Diamonds, of which the following is a specification.

This invention relates to a certain improvement in glaziers' diamonds which are employed for cutting glass. The object is to provide a glazier's diamond glass cutter with means whereby one and the same cutter may suffice for cutting straight edges, and also curved, circular or part circular edges.

The accompanying drawings illustrate my invention.

Figure 1:
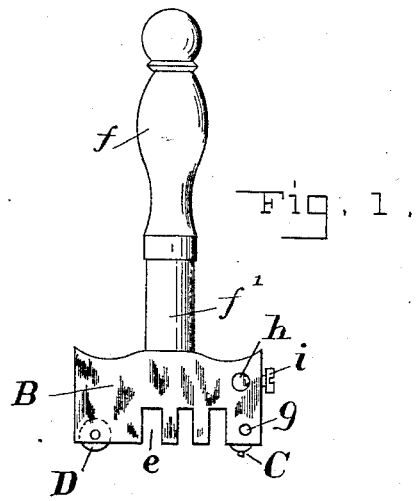
Figure 2:
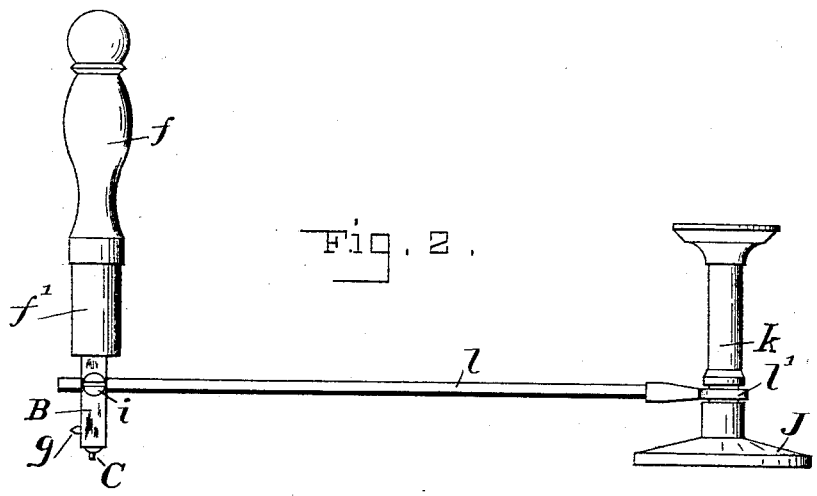

Figure 1 is a side view of my glass cutter as used for straight cuts; Fig. 2 an edge view, or a view from the transverse direction to that shown in Fig. 1, and shows the cutter arranged for cutting curved or circular cuts.

The glazier's diamond here illustrated has the features shown in the Letters Patent of the United States granted me September 7, 1875, No. 167,575, to wit: the long head, B, with flat sides, the diamond, C, at one end, a roller, D, at the other end, and notches, $e$, in the face located centrally between the diamond and roller. A handle, $f$, is fixed in a socket, $f'$, at the back of the head.

The above-described device represents one of that type of glass cutters heretofore used for making straight cuts only.

It is proper to state that devices have heretofore been employed in combination with glaziers' diamonds whereby curved or circular cuts could be made; but in such cases the glazier's diamond employed was not adapted to make any other cuts than the curved or circular cuts referred to.

By my improvements now to be described one and the same glazier's diamond is adapted for use in making straight cuts as well as curved or circular cuts; in other words, one diamond tool may now be used for purposes which formerly required two. The long head, B, having two flat sides is suited to be drawn along the edge of a ruler or other "straight edge" guide, but it is essential in order to insure a "cut" that the diamond be drawn in one certain direction; for instance, from the position the tool has in Fig. 1 it should be drawn in a direction from right to left. A right-handed person, of course, would draw from the left toward the right, but the particular view shown in Fig. 1 is given in order to expose the pin or lug, $g$, projecting laterally only from one of the flat sides of the head, B. This lug is at the end where the diamond is attached. The opposite flat side of the head, which is smooth and free of any projection, is the proper side to rest against a ruler or straight edge when making a cut. This projecting pin or lug is one feature of my present invention. It will be seen that should the person who may be using the tool inadvertently place the flat side of the head which has the pin or lug, $g$, against the ruler or straight edge, he would instantly discover that his tool was improperly placed and at once would reverse its position to place its smooth side against the straight edge.

Another feature of this invention is that I provide the head, B, with a hole, $h$, opening through the broad side; said hole is located at the end of the head where the diamond is, being above the pin or lug, $g$. A set-screw, $i$, enters the end edge of the head, B, and the point-end of this screw projects into the aforesaid hole, $h$. The hole, $h$, and set-screw, $i$, in no way interfere with the utility of the tool when it is used for making straight cuts, and they adapt the same tool for use when it is desired to make curved or circular cuts. For the last-named service a rod pivoted to a fixed base is employed. The base, J, has a stationary standard, $k$, which serves as a pivot; a rod, $l$, has an eye, $l'$, at one end which loosely encircles the standard, $k$, so as to allow the rod to be turned, or to swing around in a horizontal plane. The free end of the rod, $l$, is inserted in the hole, $h$, in the head and the set-screw, $i$, impinges against the rod and firmly holds it. It will now be seen that by using the standard, $k$, as a center or pivot, the diamond cutter may cut curves or circles of any radius.

Having thus described my invention, what

I claim as new, and desire to secure by Letters Patent, is—

A glazier's diamond having a head provided with flat sides; a diamond in its face at one end; a roller in its face at the other end; and a pin or lug, g, projecting laterally only from one of said flat sides of the head.

In testimony whereof I affix my signature in the presence of two witnesses.

PHILIP SINSZ.

Witnesses:
CHAS. B. MANN, Jr.,
C. CALVERT HINES.